United States Patent [19]
Porta

[11] Patent Number: 6,053,075
[45] Date of Patent: Apr. 25, 2000

[54] DEVICE FOR CONTROLLING THE LOCKING AND UNLOCKING OPERATIONS OF A GEAR WHEEL-ROTARY DISC ASSEMBLY AND APPARATUS INCLUDING SUCH A DEVICE

[76] Inventor: Oscar Porta, Via San Lorenzo, 37/B, 25060 Cogozzo di Villa Carcina (Brescia), Italy

[21] Appl. No.: 09/236,116

[22] Filed: Jan. 22, 1999

[30] Foreign Application Priority Data

Apr. 2, 1998 [IT] Italy .................................. MI98A0709

[51] Int. Cl.⁷ .................................................. B23Q 16/06
[52] U.S. Cl. ..................... 74/826; 74/813 L; 29/48.5 R
[58] Field of Search ............. 74/813 R, 813 L, 74/826; 192/215, 144, 148; 29/48.5 R, 48.5 A

[56] References Cited

U.S. PATENT DOCUMENTS

| | | | |
|---|---|---|---|
| 3,798,722 | 3/1974 | Lutz .................................. | 74/813 L X |
| 4,467,680 | 8/1984 | Kettel ................................ | 74/813 L X |
| 5,187,847 | 2/1993 | Thumm et al. ................... | 74/813 L X |

*Primary Examiner*—Richard M. Lorence
*Attorney, Agent, or Firm*—Hedman, Gibson & Costigan, P.C.

[57] ABSTRACT

A device for controlling the locking and unlocking operations of a gear wheel-rotary disc assembly comprises a ball for circulating screw having one end thereof coupled to a rotating coupling member. The screw is in turn rotatably engaged in a fixed ring-nut, which is housed in the bed of the device, to allow the screw to be axially driven, under the control of a driving motor.

With respect to prior like devices, the inventive device allows the rotary disc to be driven quicker and more accurately from a locking position to an unlocking position thereof.

17 Claims, 4 Drawing Sheets

DEVICE FOR CONTROLLING THE LOCKING AND UNLOCKING OPERATIONS OF A GEAR WHEEL-ROTARY DISC ASSEMBLY AND APPARATUS INCLUDING SUCH A DEVICE

BACKGROUND OF THE INVENTION

The present invention relates to a device for controlling the locking and unlocking operations of a gear wheel-rotary disc assembly, and an apparatus including such a device.

The field of the invention is that of implements provided for driving the locking and unlocking operations of a rotary disc or platform such as the rotary table of a transfer apparatus, a rotary table conveyor and the like in which, after the rotary movement, the locking operation is performed by means of a gear wheel coupling system (for example of the HIRT's type).

In such an application, the rotary disc can perform axial movements, i.e.:

a movement or stroke in which the rotary disc is moved toward the apparatus bed, at the end of which displacement, the teeth of the movable gear wheel, provided on the rotary disc, engage with corresponding teeth of a fixed gear wheel provided on the apparatus bed; this position corresponding to a locking or stop condition of the rotary disc;

and a movement or stroke in which the rotary disc is driven away from the apparatus bed, at the end of which movement, the teeth of the movable gear wheel are fully disengaged from those of the fixed wheel; this position corresponding to an unlocking condition of the rotary disc which, accordingly, can freely rotate.

The above disclosed axial movements of the rotary disc are conventionally performed by using hydraulic or pneumatic cylinder-piston assembly which, however, cannot provide a very accurate driving of the rotary disc, which, in modern digitally controlled apparatus must turn with a very high speed. Thus, prior apparatus including the disclosed rotary disc assembly operate with a comparatively low speed and, moreover, they are noisy and their operating precision is frequently unsatisfactory. Under particular operating conditions, moreover, the mentioned drawbacks could cause failures of the gear wheels, because of an interference meshing of the teeth of the movable gear wheel with those of the fixed gear wheel, with the rotary disc in a rotary condition.

SUMMARY OF THE INVENTION

Accordingly, the aim of the present invention is to overcome the above mentioned drawbacks by providing a control device of the above mentioned type, allowing the rotary disc to be quickly and accurately operated from a locking position thereof to an unlocking position thereof.

Within the scope of the above mentioned aim, a main object of the present invention is to provide such a rotary disc locking and unlocking movement control device, which is very reliable in operation and less noisy than prior like control devices.

According to one aspect of the present invention, the above mentioned aim and objects, as well as yet other objects, which will become more apparent hereinafter, are achieved by a device for controlling the locking and unlocking operations or movements of a rotary disc, including a gear wheel system, said device being essentially characterized in that it comprises rotary and axially displaceable members, for causing said disc to be axially displaced or driven from a locking position to an unlocking position thereof, at the end of the rotary movement of said disc.

According to other features of the present invention, said rotary and axially displaceable means comprise a ball recirculating screw-nut screw assembly. Said screw is moreover rotatably arranged in said ring nut, the latter being held at an axially fixed position with respect to said screw.

The device according to the invention is moreover characterized in that said screw has one end thereof engaging, in an axially sliding manner, with a rotary coupling member, in turn driven by a driving motor.

A tongue-slot assembly is moreover provided for causing said end of said screw to rotatively engage, in an axially sliding manner, with said rotary coupling member.

The other end portion of the control device according to the invention is rigidly axially mounted on said rotary disc. A main rotary gear is moreover provided rigidly associated with said rotary disc, said gear being provided with a recess for engaging with said ball recirculating screw end portion. That same end portion is furthermore provided with a projecting shoulder and a locking bushing axially extending of said gear.

According to yet other features of the inventive device, a cup spring pack is coaxially mounted on said screw, said cup spring pack operating to lock said control device in a voltage failure condition. In other words, in a voltage failure condition, the rotary table will be held in a locked condition by said cup spring assembly. To that end, said cup spring assembly is housed in a recess of the bed of said device, which recess or seat is in turn provided with a fixed portion and a movable portion for engaging the opposite end portions of said cup spring pack, the springs of said cup spring pack operating to drive said movable portion away from said fixed portion. The mentioned movable portion is moreover axially rigid with said screw by a shoulder provided with a bearing member.

The motor for operating the ball recirculating screw of the inventive control device comprises a brake for preventing said screw from being axially recovered at a locking position, if the two mentioned gear wheels have their teeth in a not properly oriented conditions. For example, in the case of a voltage failure with the table in a rotary condition, the brake would be actuated thereby preventing the movable gear wheel from closing on the fixed gear wheel. A motor-gear assembly is moreover provided for rotatively driving said disc.

The invention also relates to a rotary table or disc apparatus including a control device as above disclosed. Such an apparatus, in particular, would be a rotary table or disc transfer machine tool.

With respect to prior devices of the above mentioned type, the inventive device provides the advantage of allowing a quicker and more accurate displacement or driving of the rotary disc between its locking and unlocking positions, thereby improving the reliability and operative yield of the system while overcoming any interference problems susceptible to affect the mentioned gear wheels as the rotary disc continues to turn. Thus, an apparatus including the inventive control device will be more simple and inexpensive if compared with prior like apparatus including hydraulic or pneumatic means for axially driving the rotary disc.

BRIEF DESCRIPTION OF THE DRAWINGS

The above mentioned and other features, objects and advantages of the invention will become more apparent from the following detailed disclosure, with reference to the accompanying drawings showing, by way of a not limitative example, a preferred embodiment of the invention. In the drawings, which constitute an integrating part of the present disclosure.

DESCRIPTION OF THE PREFERRED EMBODIMENT

Figure 1:
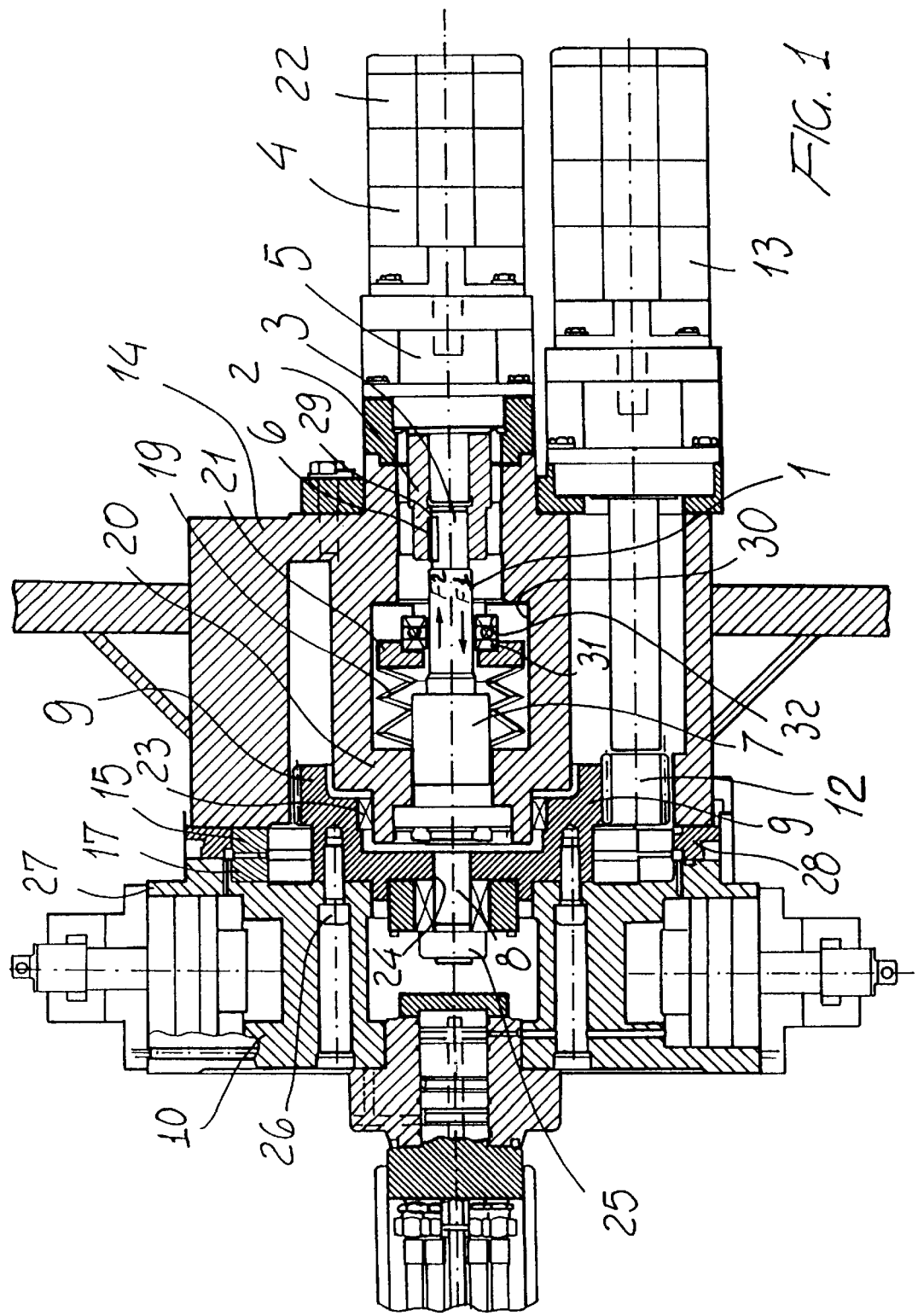
FIG. 1 is an axial cross-sectional view illustrating the control device according to the invention with the rotary disc in a locked condition.
Figure 2:
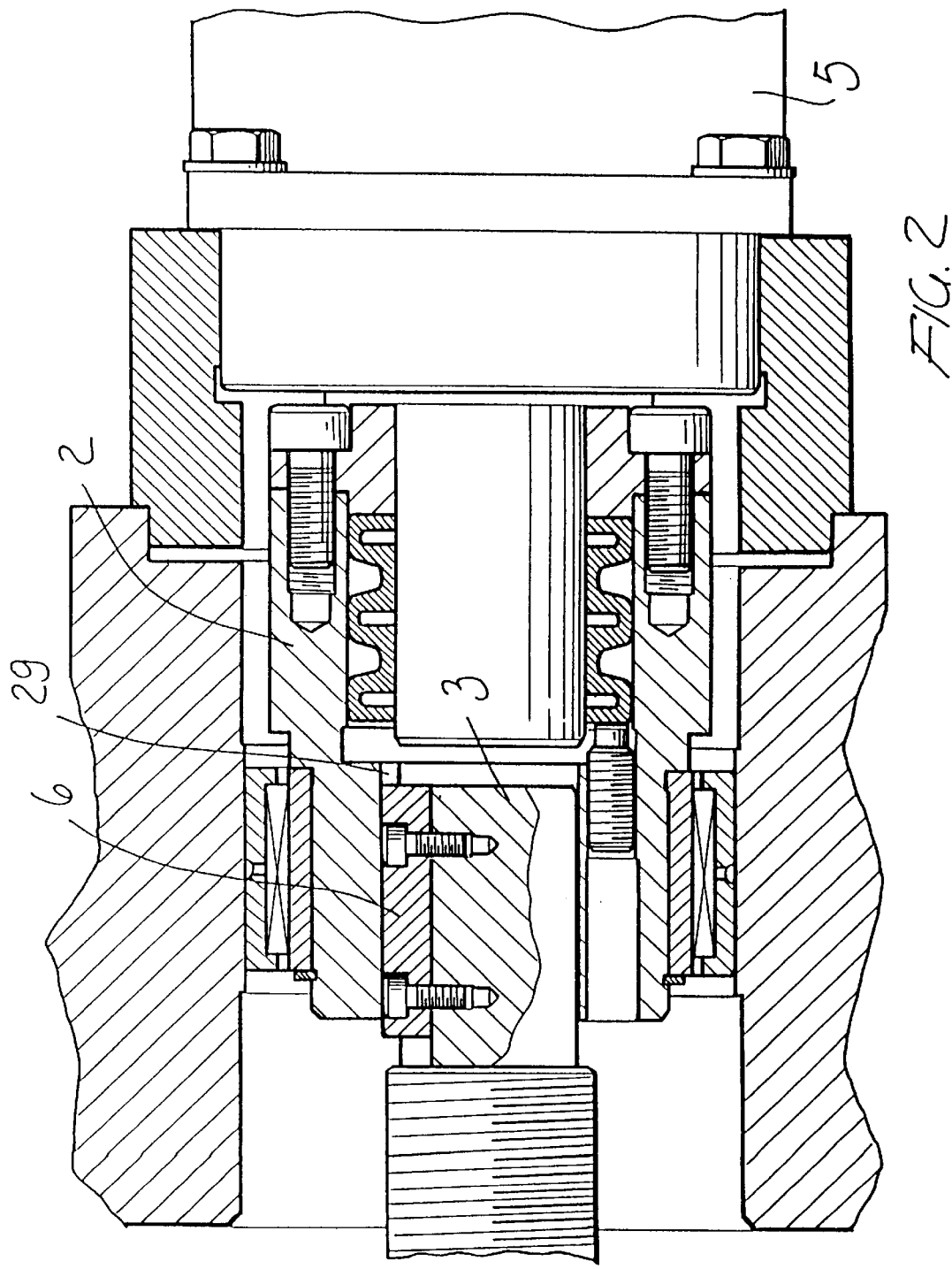
FIG. 2 illustrates a detail of the attachment portion of the screw to the rotary coupling member of the device of FIG. 1.

The device shown in FIG. 1 comprises a ball recirculating screw 1, having one end portion 3 thereof coupled to a rotary coupling member 2 which, in turn, is driven by a motor 4—reducing unit 5 assembly. The coupling of the coupling member 2 to said end portion 3 of the screw 1 is of an axially slidable type, and is performed by coupling tongues 6 and slots 29, as it is clearly shown in FIG. 2. As clearly shown in said FIG. 2, a tongue 6, by sliding in its related slot 29 will allow the coupling member 2 and screw 1 to turn, while allowing the end portion 3 of said screw 1 to axially move in the direction of the arrows F1 and F2 of FIG. 1.

The ball recirculating screw 1 is rotatably engaged in a fixed ring nut 7, in turn mounted in the bed or base 14 of the device, to allow the disclosed axial displacement of said screw, as said screw is rotatively driven by the motor 4.

The end portion 8 of the screw 1 opposite to said end portion 3 thereof coupled to the coupling member 2, is rigid with the rotary main gear 9, on which is in turn fixed the rotary disc or table 10 of the apparatus. Said gear essentially comprises a circular plate, which can turn on bearings 23 and is provided with a perforated seat 24 for engaging on the corresponding end portion 8 of the screw 1. The main gear 9 is moreover axially rigid with said screw by a bushing 25, provided for clamping said main gear against a shoulder formed on said end portion 8 of said screw 1. The rotary disc 10, as shown in FIG. 1, is anchored to the main gear 9 by a screw assembly 26, and being rotatively driven by a gear 12 coupled to a driving motor 13.

On the surface 27 of the disc 10 facing the bed 14 of the apparatus is provided a gear wheel 17 (for example of the HIRT type) provided with a plurality of teeth 18 and fixed to said disc 10 to be rotatively driven therewith. On the surface 28 of the bed 14 facing the corresponding surface 27 of the disc 10 is moreover provided a further gear wheel 15, corresponding to the disclosed gear wheel 17, the teeth 16 of said gear wheel 15 being designed for meshing with the teeth 18 of the g ea r wheel 17.

In operation, starting with the rotary disc 10 in a locked condition thereof, in which the teeth 16 and 18 of the gear wheels 15 and 17 are mutually engaged (FIG. 1), the motor 4 will rotatively drive the coupling member 2 (for example clockwise). Then, the coupling member 2 will in turn rotatively drive the end portion 3 of the screw 1, through the above disclosed tongue 6—islot 29 assembly of the coupling member 2. Since the screw 1 is engaged in the fixed ring nut 7, said screw will be axially driven in the direction of the arrow F1 of FIG. 1, because of the disclosed sliding coupling of th e tongues 6 and slots 29.

Figure 3:
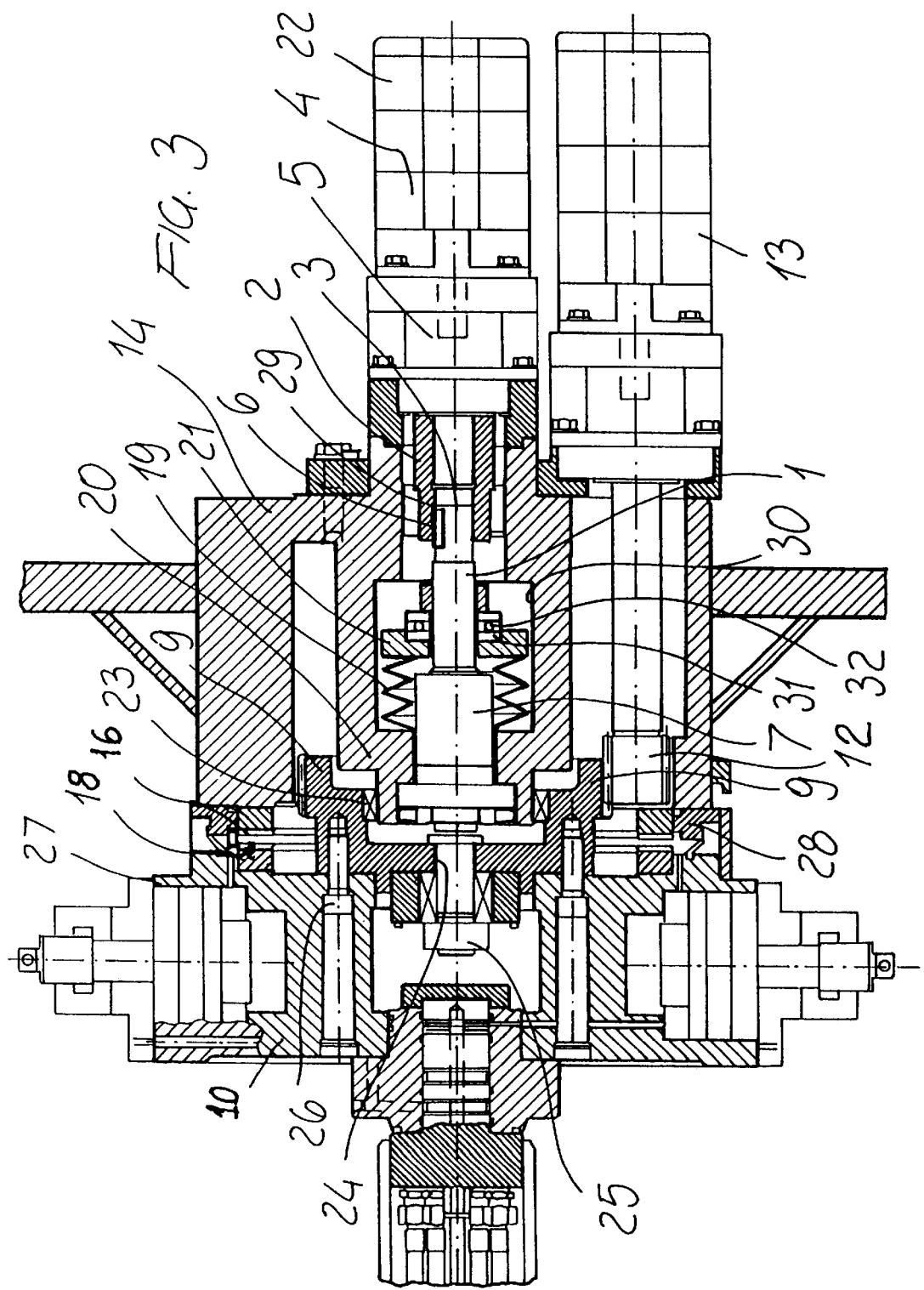
FIG. 3 illustrates the device of FIG. 1 with the rotary disc in an unlocked condition or position.

The axial displacement of the screw 1 is transmitted, through the shoulder provided on the end portion 8 of said screw for clamping the main gear 9, to the main gear 9 and disc 10, which will be driven away so as to cause a full disengagement of the fixed and movable gear wheels 15 and 17 respectively of the device (unlocking position of FIG. 3).

Then, the motor 13 will rotatively drive the disc 10 to the desired angular displacement, and then the motor 13 will be disactuated (to stop the rotary disc 10), and the motor 4 will cause said disc 10 to return to the locking position shown in FIG. 1. To that end, the screw 1 will be turned in a direction opposite to the above mentioned direction, inside the fixed ring-nut 7, with a consequent axial displacement of the screw 1—gear 9—disc 10 assembly in the direction of the arrow F2 to cause a mutual full engagement of the teeth of the gear wheels 15 and 17 (locking position of FIG. 1).

The shown device comprises moreover a cup spring pack 19, operating for recovering and holding the screw 1 at a locking position, since the screw-ring nut assembly is a reversible system (and, accordingly, to also recover the rotary disc 10) upon a switching off of the electric voltage to the motor 4. To that end, the springs 19 are housed, coaxially to the screw 1, inside a recess or seat 30 of the bed 14, and they will operate between a fixed portion 20 of said recess and a movable portion 21 thereof. Said movable portion 21, in particular, is axially slidably mounted together with the screw 1 inside the mentioned recess or seat 30 and is rigid with said screw 1 at a shoulder 31 provided with a bearing element 32.

In a case of a failure of the power supply to the electric motor 4 (in an emergency condition), the cup spring pack 19 will operate to drive the mentioned movable portion 21 away from the fixed portion 20 (arrow F2 of FIG. 1), thereby causing the screw 1, and disc 10 associated therewith, to automatically recover or return to the locking position shown in FIG. 1 (in which the movable and fixed gear wheels are arranged near one another). Moreover, in order to prevent said screw 1 from recovering with the teeth 16 and 18 at an improper position, a brake 22 is provided on the motor 4 for opposing to the return effect of the spring pack 19.

Figure 4:
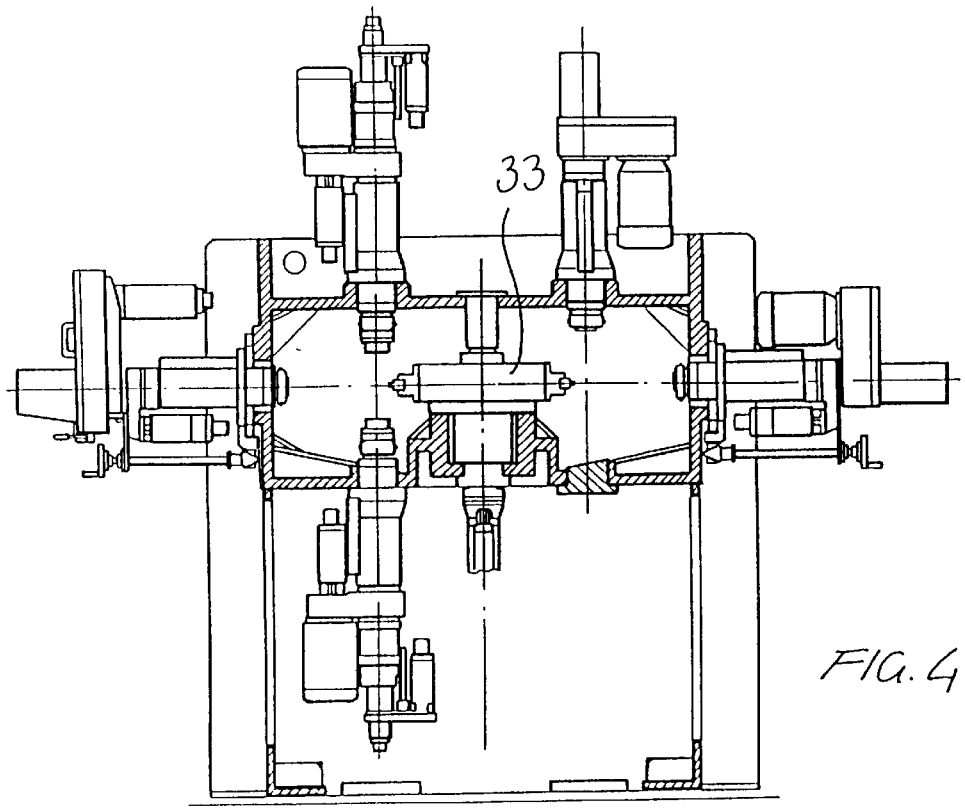
FIGS. 4 and 5 illustrate two machine tools of a transfer type, having respectively a vertical axis and a horizontal axis, and including a control device according to the present invention.
Figure 5:
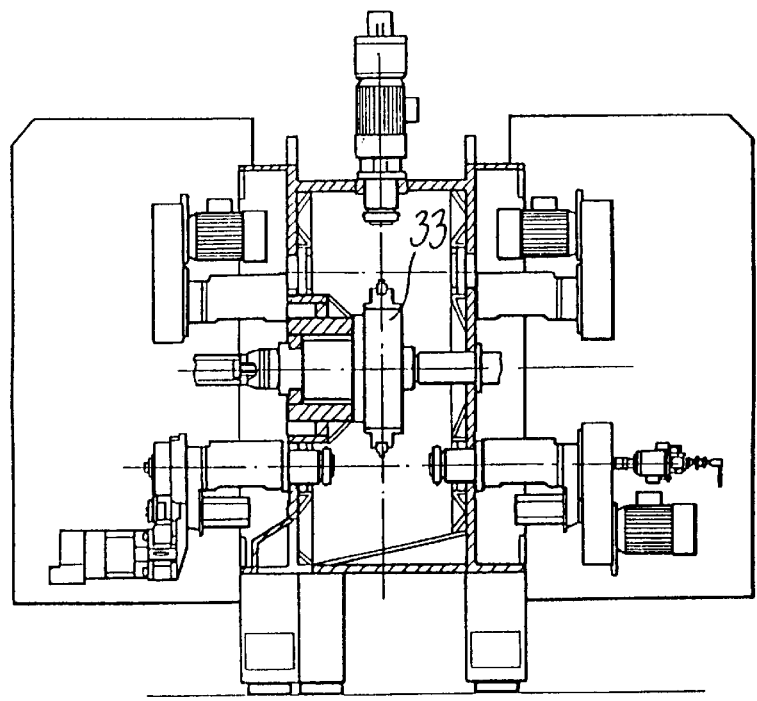

The above disclosed device can be used, for example, on machine tools of the transfer type as shown in FIGS. 4 and 5, including a rotary disc or table 33 having respectively either a vertical or a horizontal axis.

The invention, as above disclosed, is susceptible to several modifications and variations all coming the within the scope of the accompanying claims. Thus, for example, the screw 1—ring nut 7 assembly can provide a ring nut 7 movable with respect to the screw 1, in which case the rotary disc 10 would be coupled to the ring nut 7 instead of the screw 1. The system for automatically recovering the device to a locking condition could comprise means equivalent to the cup spring pack 19, and the connection of the coupling member 2 to the screw 1 could be performed by means different from the shown and illustrated means, while providing the same operation as disclosed.

I claim:

1. A control device for controlling the locking and unlocking operations of a rotary disc with a gear wheel system, comprising; a ball recirculating screw-ring nut assembly including a ball recirculating screw rotatable and axially slidably engaged in a ring nut;

a connection between said rotary disc and said ball recirculating screw such that said rotary disc is displaced axially together with said ball recirculating screw; and a device for driving said ball recirculating screw-ring nut assembly such that said ball recirculating screw is axially displaced between a first position in which said rotary disc is arranged for engaging a fixed gear wheel for blocking said rotary disc from rotation and a second position in which said rotary disc is arranged so that it is disengaged with the fixed gear wheel for permitting rotation of said rotary disc.

2. A device according to claim 1, further comprising a spring means for biasing said ball recirculating screw in said first position.

3. A device according to claim 2, characterized in that said screw (1) is rotatably and axially slidably arranged in said ring nut (7).

4. A device according to claim 1, characterized in that said device comprises moreover a motor (13)—gear (12) assembly for turning said disc (10).

5. A rotary disc apparatus, characterized in that said rotary disc apparatus comprises a control device according to claim 1.

6. An apparatus according to claim 5, characterized in that said apparatus comprises a machine tool of a transfer type and including a rotary disc having either a vertical or a horizontal axis.

7. A control device for controlling the locking and unlocking operations of a rotary disc with a gear wheel system, said control device comprising rotary and axially displaceable means for axially displacing said disc (10) from a locking position to an unlocking position thereof at the end of the rotary movement of said disc, said rotary and axially displaceable means comprising a ball and recirculating screw (1)-ring nut (7) assembly, said screw (1) being rotatably and axially slidably arranged in said ring nut (7), and said screw (1) being provided with an end portion (3) engaging, in and axially slidably manner, with a rotating coupling member (2), in turn driven by a driving motor (4).

8. A device according to claim 7, characterized in that said device comprises a tongue (6)—slot (29) assembly for rotatably and axially slidably engaging said end portion (3) of said screw (1) on said coupling member (2).

9. A device according to claim 7, characterized in that said device comprises moreover driving means for causing said device to automatically recover to a locking position thereof in a case of a failure of said motor (4).

10. A device according to claim 9, characterized in that said driving means are of and elastic deforming type.

11. A device according to claim 10, characterized in that said driving means comprise a cup spring pack (19) coaxially arranged on said screw (1).

12. A device according to claim 11, characterized in that said cup spring pack (19) is housed inside a recess (30) of a bed (14) of said device, said recess (30) comprising a fixed portion (20) and a movable portion (21) for engaging opposite end portions of said cup spring pack (19), said cup spring pack (19) operating to cause said movable portion to be driven away from said fixed portion (20).

13. A device according to claim 12, characterized in that said movable portion (21) is axially rigid with said screw (21) by a shoulder (31) including a bearing element (32).

14. A device according to claim 13, characterized in that said motor (4) is moreover provided with a brake (22) for preventing said screw (1) from axially return to a locking position if the gear wheels (15, 17) have the teeth thereof not properly arranged.

15. A control device for controlling the locking and unlocking operations of a rotary disc with a gear wheel system said control device comprising rotary and axially displaceable means for axially displacing said disc (10) from a locking position to an unlocking position thereof at the end of the rotary movement of said disc, said rotary and axially displaceable means comprising a ball and recirculating screw (1)-ring nut (7) assembly, said screw (1) being provided with a further end portion (8) axially rigid with said rotary disc (10).

16. A device according to claim 15, characterized in that said device comprises moreover a rotary main gear (9) rigid with said disc (10) and provided with a recess (24) for engaging therein said end portion (8) of said screw (1).

17. A device according to claim 16, characterized in that said end portion (8) of said screw (1) is provided with an axial locking bushing (25) for axially locking said gear (9), with said end portion (8) housed in said recess (24) of said main gear (9).

* * * * *